United States Patent Office 2,862,788
Patented Dec. 2, 1958

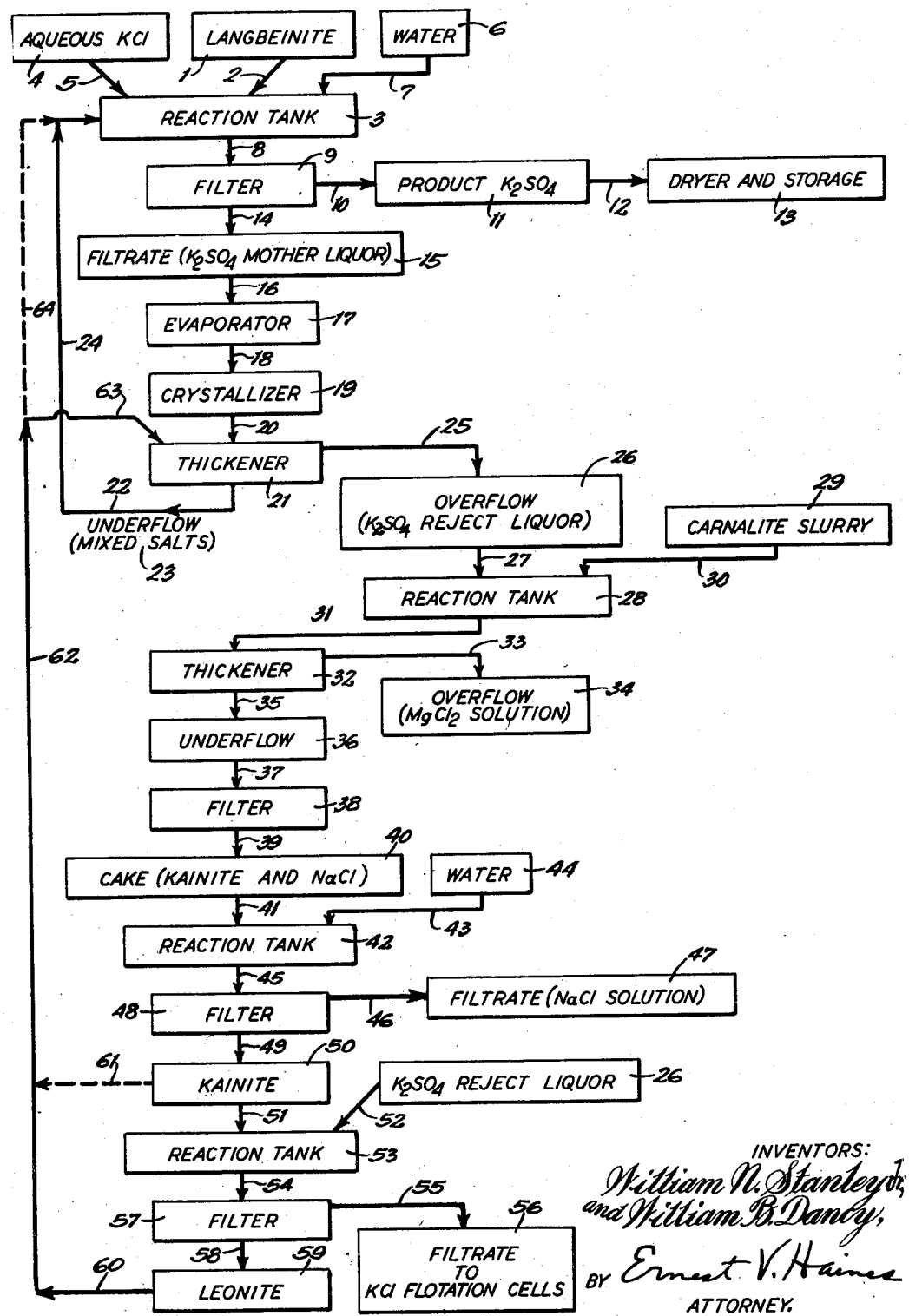

2,862,788

PROCESS FOR PURIFYING IMPURE SOLID-PHASE KAINITE

William N. Stanley, Jr., and William B. Dancy, Carlsbad, N. Mex., assignors to International Minerals & Chemical Corporation, a corporation of New York Application May 3, 1955, Serial No. 505,717

4 Claims. (Cl. 23—38)

The present invention relates to a process for the treatment of liquors to recover potassium values therefrom and, more particularly, to a process for recovering potassium and magnesium values from potassium sulfate reject liquor.

In the past, processes have been developed involving the production of potassium sulfate over and above the quantities naturally present in langbeinite $$(K_2SO_4 \cdot 2MgSO_4)$$

by reacting an aqueous solution or slurry of potassium chloride substantially free from sodium chloride with leonite and/or schoenite having the formulate, respectively, $K_2SO_4 \cdot MgSO_4 \cdot 4H_2O$ and $K_2SO_4 \cdot MgSO_4 \cdot 6H_2O$, to produce potassium sulfate and a potassium-containing mother liquor. The leonite and schoenite are produced by reacting langbeinite substantially free of sodium chloride with the mother liquor separated from the potassium sulfate crystals. In this manner a portion of the potassium content of the high potassium-containing mother liquor is recovered by the production of the solid salts, leonite and schoenite, which can be used in the reaction step with potassium chloride to produce potassium sulfate. As practiced in the past, these processes have necessarily involved the use of reactants which are substantially free of sodium chloride, but it is necessary to follow a complicated system for handling the intermediate solids and liquors as outlined in processes, such as those disclosed by U. S. Patent 2,295,257 to Butt et al. In addition, concentrations of sodium chloride, such as are present as impurities in commercially available langbeinite and 60% muriate of potash, seriously reduce the overall recoveries when practicing the processes heretofore known. It has been found in practice that actual recoveries of the order of between about 65% and about 70% of the $K_2O$ values of the raw materials are about as high as can be expected by following the processes heretofore practiced.

U. S. Patent 2,684,285 discloses a process which is an improvement over the process of U. S. Patent 2,295,257. The former patent concerns a process whereby the potassium sulfate mother liquor obtained, following a reaction between langbeinite and aqueous potassium chloride to produce potassium sulfate and the removal of potassium sulfate from the reaction mixture, is concentrated and evaporated to produce certain mixed salts, namely, potassium chloride and leonite along with some kainite ($KCl \cdot Mg \cdot SO_4 \cdot 3H_2O$). These mixed salts are recycled to the reaction vessel where the reaction between langbeinite and potassium chloride takes place. By recycling the mixed salts to the initial reaction vessel, the recovery of potash from langbeinite is improved and the overall process is more efficient than the process of U. S. Patent 2,295,257.

Heretofore, the liquor remaining following the removal of mixed salts has been discarded as waste or treated to recover the magnesium values therefrom. The potash values, if recovered at all, were recovered as low grade potassium salts, such as kainite. In accordance with the instant invention, the liquor remaining following the removal of the mixed salts, which liquor will be termed "potassium sulfate reject liquor," is treated in a manner to permit the recovery of magnesium values therefrom, but is also treated to recover a major proportion of the potassium values therefrom in the form of high grade potassium salts, such as leonite. In accordance with a specific embodiment of the instant invention, between about 60% and about 70% of the potassium values contained in potassium sulfate reject liquor are recovered as potassium sulfate.

It is an object of the present invention to increase the overall recovery of potash values from langbeinite.

It is another object of this invention to recover the potassium values from kainite containing substantial amounts of sodium chloride.

It is a further object of this invention to provide a process for recovering potash values from potassium sulfate reject liquor.

In accordance with the instant invention, kainite containing a substantial quantity of sodium chloride as an impurity is treated with water in a manner to remove substantially all of the sodium chloride from the solid kainite without altering or dissolving any substantial amounts of the kainite. The kainite can then be utilized as a low grade potash salt or it may be converted to a higher grade potash salt in accordance with one or more specific embodiments of this invention. The invention is carried out by treating kainite which may contain up to about 25% sodium chloride, by weight, with about 1 part of water for each 3 to 4 parts of kainite-sodium chloride mixture, for a period of less than about 2 minutes, preferably for less than about 1 minute at a temperature of less than about 35° C., preferably at a temperature of less than about 30° C. Following the treatment, the liquid phase containing dissolved sodium chloride is separated from the solid kainite. The treatment of the kainite-sodium chloride mixture with water results in the removal of at least about 75% of the sodium chloride. The purified kainite can be used directly as a low grade potash for fertilizer purposes or may be treated to recover the potassium values in the form of a higher grade potash salt.

In accordance with a specific embodiment of this invention, potassium values in potassium sulfate reject liquor may be recovered in the form of potassium sulfate. The potassium sulfate reject liquor which contains essentially sulfate, chloride, magnesium and potassium ions is reacted with carnallite $$(KCl \cdot MgCl_2 \cdot 6H_2O)$$

suspended in an aqueous medium saturated with respect to magnesium chloride, the reaction taking place at a temperature between about 60° C. and about 85° C. When the reaction is substantially complete, kainite solids comprising kainite salts which are formed during the reaction are separated from the mother liquor.

The mother liquor from which the kainite salts have been removed contains substantial quantities of magnesium chloride. This mother liquor is evaporated to a point near saturation with respect to bischofite $$(MgCl_2 \cdot 6H_2O)$$

that is, to a magnesium chloride concentration of between about 36% and about 40%, by weight. Evaporation is usually carried out at a temperature above about 60° C., preferably at a temperature between about 115° C. and about 120° C. The resulting mixture is then cooled and thickened, preferably at a temperature of about 90° C., which is the optimum temperature for this thickening step. However, temperatures below about 90° C. may also be employed for the thickening step. If the evaporation is carried out at a temperature above about 90° C., the concentrated mixture is cooled and thickened at a temperature below about 90° C. If the evaporation is carried out at a temperature below about 90° C., the slurry is thickened at the evaporating temperature without additional cooling. The underflow from the thickener containing carnallite is recycled to the potassium sulfate reject liquor reaction.

It is important that the potassium sulfate reject liquor prior to its reaction wih carnallite be adjusted with, for example, an alkaline compound such as sodium hydroxide, to a pH of between about 5.5 and about 6.5, preferably to a pH of about 6. If the potassium sulfate reject liquor has a pH substantially below about 6, for example, a pH of about 4 or less, considerable corrosion of equipment occurs and equally, if not more important, the kainite salts formed as a result of the reaction between the carnallite slurry and a highly acidic reject liquor are very difficult to filter. If, however, the potassium sulfate reject liquor is adjusted to a pH between about 5.5 and about 6.5, the kainite salts formed are very easily filterable.

The kainite formed by the reaction between carnallite and potassium sulfate reject liquor, upon separation from the mother liquor, is filtered to remove any excess water which may be present. The kainite contains substantial amounts of sodium chloride and the concentration of the sodium chloride will usually range from between about 5% to about 20% or more based on the total solids. Ordinarily, there will be between about 10% and about 20% sodium chloride present based on the weight of the solids.

According to one embodiment, the kainite containing sodium chloride as an impurity is admixed with water in an amount of about 1 part water to about 3 parts of solids. The resulting slurry is agitated for less than about 1 minute at room temperature. The solids are then separated from the liquid phase by any convenient means, for example, by filtration. About 70% of the magnesium values in the kainite-sodium chloride mixture and about 80% of the potassium values are recovered by this procedure while removing at least about 75% of the contaminating sodium chloride.

The kainite from which the sodium chloride has been removed can be utilized directly as a low grade potash salt, but preferably it is recycled directly to the reaction between langbeinite and aqueous potassium chloride solution to recover the potash values in the kainite as potassium sulfate. However, the mixed salts hereinabove mentioned are also recycled to this reaction station. The separate introduction of the mixed salts and kainite increases substantially the difficulty of maintaining the overall process within its prescribed reaction conditions. It is preferred that the kainite produced from the kainite-purifying reaction be uniformly admixed with the mixed salts prior to addition to the langbeinite-potassium chloride reaction. By operating in this manner, there are no additional variables to be controlled and the problem of maintaining the essential reaction conditions throughout the overall process is not increased.

The potassium sulfate reject liquors utilized in this invention are illustrated by the reject liquors produced in processes such as are described and claimed in U. S. Patent 2,295,257 to Butt et al., and U. S. Patent 2,684,285 to Dancy. A typical potassium sulfate reject liquor suitable for the practice of the instant invention contains between about 5.3% and about 6.7%, by weight, of potassium chloride, between about 1.8% and about 3.3%, by weight, of sodium chloride, between about 6.2% and about 7.5%, by weight, of magnesium sulfate, between about 15.5% and about 18.3%, by weight, of magnesium chloride, and between about 66.0% and about 68%, by weight, of water.

In the kainite formation step sufficient carnallite slurry, the liquid phase of which is substantially saturated with magnesium chloride, is added to the potassium sulfate reject liquor so that the resulting liquor will be nearly saturated with respect to carnallite, for example, kainite is obtained by mixing between about 1.15 parts and about 1.35 parts, by weight, of potassium sulfate reject liquor per part of carnallite slurry. Kainite is formed in the above described slurry at a temperature between about 10° C. and about 85° C. Although kainite is formed in the slurry throughout the entire temperature range mentioned, the rate of formation of kainite is sufficiently rapid to be commercially feasible only at temperatures above about 60° C. The kainite salts which are separated from the solution have a $K_2O$ content of about 22% and magnesium oxide content of about 15%. The kainite-forming reaction is carried out until the formation of kainite is substantially complete. This usually requires between about 2 hours and about 4 hours. The kainite salts produced by the reaction between carnallite and potassium sulfate reject liquor have a typical analysis after washing and drying as follows:

| | Percent by weight |
|---|---|
| Potassium chloride | 34.97 |
| Magnesium sulfate | 44.67 |
| Sodium chloride | 19.77 |

About 93% of the $K_2O$ values in the potassium sulfate reject liquor are found in the kainite salts.

In another embodiment of this invention, kainite which has been treated to remove the sodium chloride contaminant as above described is reacted with potassium sulfate reject liquor, whereby the kainite is converted to leonite. The proportions of kainite and potassium sulfate reject liquor are regulated to produce a reaction mixture having a magnesium chloride concentration below that at which carnallite will precipitate, that is, the magnesium concentration in the reaction mixture is maintained below about 6.8%, by weight, and preferably as low as possible. The magnesium concentration is conveniently regulated to between about 6.2% and about 6.4%, by weight. The magnesium concentration can be reduced by increasing the ratio of potassium sulfate reject liquor to kainite in the reaction mixture. The reaction mixture is agitated at a temperature between about room temperature and about 50° C., preferably between about 30° C. and about 35° C., until substantially all of the kainite is converted to leonite. Following completion of the reaction, the reaction product mixture is filtered to remove the leonite solids, and the filtrate obtained, which comprises a magnesium chloride solution, is suitable for separate processing to recover the magnesium values therefrom. The leonite recovered may be utilized directly as a high grade potash fertilizer component, but preferably it is reacted with langbeinite and an aqueous potassium chloride solution to produce potassium sulfate. The leonite may be added directly to the reaction vessel, wherein langbeinite is reacted with aqueous potassium chloride solution, but preferably it is admixed with the mixed salts, and the admixture is recycled to the langeinite-potassium chloride reaction vessel. By operating in this manner, rather than by adding the leonite separately to the langbeinite reaction vessel, the number of variable reactants entering the langbeinite reaction vessel is maintained at a minimum, making it less difficult to control the essential reaction conditions in the overall recovery process.

For a more complete understanding of the instant process reference may be had to the figure which is a flow sheet of a preferred embodiment of the instant process.

An aqueous solution of potassium chloride, for example, 60% muriate of potash solution 4 is allowed to enter reaction tank 3 by line 5. Water 6 enters the reaction tank by line 7 and langbeinite 1 enters the reaction by line 2. The mixture is agitated and allowed to react at about 45° C. for a period of time sufficient to allow the reaction to reach equilibrium. Thereafter the reaction product mixture is transferred to filter 9 by line 8.

The solid potassium sulfate product is removed from the filter 9 by line 10 and sent to dryer and storage 13 by line 12. The filtrate 15 from filter 9 is removed by line 14 and is transferred to evaporator 17 by line 16. A concentrated material from evaporator 17 is conveyed to crystallizer 19 by line 18. In the evaporator the filtrate 15 is carefully evaporated to a point just short of the crystallization of sodium chloride and/or magnesium chloride when the liquid is at room temperature. As previously stated, the evaporation is preferably carried out below the atmospheric boiling point of the mother liquor, for example, by use of reduced pressure.

The concentrated mother liquor is then transferred by line 18 to crystallizer 19 where it is quickly cooled to below 55° C. The resultant crystalline mixture is conveyed to thickener 21 by line 20 where the solids 23 comprising essentially potassium chloride, kainite and leonite are separated and removed by line 22 and recycled to reaction tank 3 by line 24. The filtrate 26, which is potassium sulfate reject liquor, is removed from thickener 21 by line 25 and is conveyed to reaction tank 28 by line 27. Carnallite slurry 29 is added to reaction tank 28 by line 30. The mixture in reaction tank 28 is agitated and allowed to react at a temperature of between about 60° C. and about 85° C. until kainite formation is substantially complete. Reaction is usually complete in between about 2 hours and about 4 hours. The kainite reaction product mixture is then transferred to thickener 32 by line 31. Overflow 34 from thickener 31 is removed by line 33. This liquid comprises a concentrated magnesium chloride solution and is suitable for processing for the recovery of magnesium values therefrom. Solids 36 are removed as underflow from thickener 32 by line 35. These solids are comprised essentially of kainite and sodium chloride, the sodium chloride amounting to between about 5% and about 25% based on the weight of the solids. This kainite-sodium chloride mixture 36 is transferred to filter 38 by line 37 where excess liquor is removed and the filter cake 40 is transferred to reaction tank 42 by line 41. Water 44 is added to the reaction tank by line 43. The amount of water added must amount to between about 25% and about 35% based on the weight of the solids mixture 40 which is added to reaction tank 42. The temperature in reaction tank 42 is maintained at less than about 35° C., and preferably less than about 30° C. The slurry in reaction tank 42 is agitated for less than about 2 minutes, and preferably less than about 1 minute, and is then transferred by line 45 to filter 48 where the liquor containing dissolved sodium chloride 47 is removed by line 46. A sodium chloride solution 47 contains usually at least about 75% of the sodium chloride present in the solids 40. Kainite 50 from filter 48 is recovered by line 49 and can be recycled by lines 61, 62 and 63 to thickener 21 where it is uniformly mixed with mixed solids—salts 23 to be recycled by line 24 to reaction tank 3—or it can go directly to line 24 from line 61 by way of lines 62 and 64. Alternatively, kainite 50 is transferred to reaction tank 53 by line 51 where is is admixed with potassium sulfate reject liquor 26, which is added to the reaction tank 53 by line 52. The reaction mixture in reaction tank 53 is agitated until the reaction reaches equilibrium. Thereafter, the reaction product mixture is transferred to filter 57 by line 54 and potassium chloride containing solution 56 is removed by line 55. Leonite 59 from filter 57 is recovered by line 58 and recycled by lines 60, 62 and 63 to thickener 21 where it is uniformly mixed with solids 23 comprising mixed salts and recycled with these mixed salts by line 24 to reaction tank 3, leonite 59 or may go directly by lines 60, 62 and 64 into line 24 and reaction tank 3. In reaction tank 3 these mixed salts will react with langbeinite and aqueous potassium chloride solutions to produce potassium sulfate. Between about 70% and about 80% of all of the potassium values in the potassium sulfate reject liquor may be recovered in accordance with the instant process as potassium sulfate. Also, filtrate 56 and overflow 34, which are to be processed for the recovery of potassium values and magnesium values, are substantially free of excessive amounts of sodium chloride, the sodium chloride having been removed in the form of sodium chloride solution 47. Sodium chloride solution 47 is discarded.

The following examples illustrate specific embodiments of this invention. All parts and percentages are by weight unless otherwise indicated.

EXAMPLE I

About 121 parts of potassium sulfate reject liquor having a pH of about 6 and the composition indicated in Table 1 was added to about 100 parts by weight of a thickened slurry of crude carnallite salts and crude carnallite mother liquor of the composition indicated in Table 1.

Table 1

|  | Temp., ° C. | K | Mg | Na | Cl | SO₄ | H₂O |
| --- | --- | --- | --- | --- | --- | --- | --- |
| Potassium sulfate reject liquor |  | 3.40 | 5.44 | 1.12 | 16.84 | 5.19 | 68.01 |
| Carnallite slurry | 90 | 6.01 | 8.94 | 1.29 | 32.20 | 1.78 | 49.78 |
| Crude kainite |  | 11.47 | 8.55 | 3.82 | 18.40 | 30.73 | 27.03 |
| Washed kainite |  | 13.05 | 8.55 | 1.17 | 13.80 | 33.19 | 30.23 |
| Filtrate |  | 3.81 | 4.04 | 3.60 | 12.52 | 11.03 | 65.00 |

The resulting mixture was agitated at a temperature of about 65° C. until the sulfate concentration of the liquor had been reduced to below about 2%. The kainite salts which crystallized were separated from the liquor. Fifty parts of crude kainite filter cake were agitated with 17.5 parts of water for 1 minute at 28° C. The slurry was immediately filtered. About 75% of the sodium chloride present in the crude kainite filter cake was dissolved in the water and removed by the filtration and about 70% of the magnesium values in the crude kainite filter cake was recovered as washed kainite. The washed kainite also contained about 80% of the potassium values in the crude kainite filter cake. The washed kainite was admixed with mixed salts and the mixture added to langbeinite and aqueous potassium chloride solution in sufficient amounts to produce a reaction mixture having an analysis as shown in Table 2. The reaction mixture was agitated for about 4 hours at a temperature of about 45° C. The reaction produced solid potassium sulfate which was removed by filtration.

EXAMPLE II

A washed kainite from which contaminating sodium chloride has been removed as in Example I was admixed with sufficient potassium reject liquor having a composition as indicated in Table 1 to produce a reaction mixture having a magnesium concentration of about 6.3%, by weight. The reaction mixture was agitated at a temperature of about 35° C. until the reaction reached equilibrium. Leonite was formed during the reaction and was separated from the reaction mixture by filtration. The leonite was then admixed with mixed salts and the admixture reacted with langbeinite and potassium chloride solution to produce potassium sulfate. The mixed salts containing the added leonite, langbeinite and aqueous potassium chloride solution were added to the reaction tank in sufficient amount to produce a reaction mixture having an analysis as indicated in Table 2.

Table 2

|  | K | Mg | Na | Cl | SO₄ | Insol. | H₂O | Total |
| --- | --- | --- | --- | --- | --- | --- | --- | --- |
| Langbeinite | 83 | 52 | 3 | 4 | 307 | 2 |  | 451 |
| KCl solution | 139 | 2 | 7 | 139 | 4 |  | 757 | 1,048 |
| Mixed Salts | 145 | 7 | 1 | 131 | 31 |  | 51 | 366 |
| Water |  |  |  |  |  |  | 602 | 602 |

Potassium sulfate which was produced by the reaction was separated from the reaction product mixture by filtration and dried. By operating in accordance with this example, about 75% of the potassium values in potassium sulfate reject liquor was recovered as solid phase potassium sulfate.

Having thus fully described and illustrated the character of the instant invention, what is desired to be secured by Letters Patent is:

1. A process for purifying impure solid-phase kainite containing solid-phase sodium chloride as an impurity in a proportion between about 5 and about 25% by weight, based on total solids, which comprises slurrying said impure kainite with between about 25 and about 35% by weight of water, based on total solids, at a temperature of less than about 35° C. for a contact time, less than about 2 minutes, sufficient to selectively dissolve at least about 75% of the solid-phase sodium chloride contained in said impure kainite, and separating solid, purified kainite from the liquid phase.

2. A method as in claim 1 wherein said impure kainite is slurried with water for a contact time of about 1 minute.

3. In a process for recovering potassium values from potassium sulfate reject liquor which comprises reacting a potassium sulfate reject liquor containing sulfate, chloride, magnesium, potassium, and sodium ions with a suspension of carnallite in an aqueous medium substantially saturated with respect to magnesium chloride at a temperature between about 60 and 85° C., separating impure solid-phase kainite from the resulting mixture upon substantial completion of the reaction, said kainite containing between about 5 and about 25% by weight of solid-phase sodium chloride as an impurity, based on total solids, and washing said impure kainite, the improved method of washing which comprises slurrying said impure kainite with between about 25 and about 35% by weight of water, based on total solids, at a temperature of less than about 35° C. for a contact time, less than about 2 minutes, sufficient to selectively dissolve at least about 75% of the solid-phase sodium chloride contained in said impure kainite, and separating solid, purified kainite from the liquid phase.

4. In a process for recovering potassium values from kainite containing between about 5 and about 25% by weight of sodium chloride, based on total solids, as an impurity, wherein said kainite is admixed with water, potassium chloride, and langbeinite, the mixture is agitated at a temperature between about 15 and about 60° C. for a period of about 1 to about 4 hours, and the resulting crystals of potassium sulfate are separated from the reaction product mixture, the improvement which comprises pretreating said kainite in solid form by slurrying with between about 25 and about 35% by weight of water, based on total solids, at a temperature of less than about 35° C. for a contact time, less than about 2 minutes, sufficient to selectively dissolve at least about 75% of the solid-phase sodium chloride contained in said kainite, and separating solid kainite, depleted of sodium chloride, from the liquid phase, whereby sodium chloride contamination in the subsequent operations is substantially reduced.

References Cited in the file of this patent

UNITED STATES PATENTS

| | | |
|---|---|---|
| 1,589,519 | Dolbear | June 22, 1926 |
| 1,794,553 | Schoch | Mar. 3, 1931 |
| 2,684,285 | Dancy | July 20, 1954 |
| 2,687,339 | Dancy et al. | Aug. 24, 1954 |

OTHER REFERENCES

Mellor: "Comprehensive Treatise on Inorganic and Theoretical Chemistry," vol. 4, page 340. Longmans, Green and Co., N. Y., 1923.

Seidell: "Solubilities of Inorganic and Organic Compounds," vol. 1, pages 387, 396, 556 and 640. D. Van Nostrand Co., N. Y., 1919.